United States Patent [19]

Mitton

[11] 4,324,119
[45] Apr. 13, 1982

[54] PASSIVE WHEEL LOCK FOR BICYCLES AND THE LIKE

[76] Inventor: David Mitton, 425 W. Mulberry St., Fort Collins, Colo. 80521

[21] Appl. No.: 130,694

[22] Filed: Mar. 17, 1980

[51] Int. Cl.³ .................. B62H 5/00; E05B 67/06; E05B 71/00; F16B 41/00
[52] U.S. Cl. .......................................... 70/233; 70/53; 70/230; 70/232; 70/259; 280/289 L; 301/114
[58] Field of Search .............. 70/52, 53, 233, 230, 70/259, 227, 18, 226, 225, 232, 39, 49, 58, 20; 280/289 L; 301/114, 115, 111

[56] References Cited

U.S. PATENT DOCUMENTS

| 599,765 | 3/1898 | Chase | 70/53 X |
|---|---|---|---|
| 1,594,683 | 8/1926 | Nelson | 70/53 X |
| 1,614,666 | 1/1927 | Fraim | 70/230 X |
| 1,618,924 | 2/1927 | Hanton | 70/53 X |
| 1,633,172 | 6/1927 | Fraim | 70/230 X |
| 1,662,294 | 3/1928 | Bettinardi | 70/230 X |
| 1,751,779 | 3/1930 | Von Senden | 70/230 X |
| 1,921,434 | 8/1933 | Stone | 70/230 X |
| 3,713,668 | 1/1973 | Flindt | 70/259 X |
| 4,028,915 | 6/1977 | Stahl | 70/233 X |
| 4,057,985 | 11/1977 | Stahl | 70/232 X |
| 4,070,879 | 1/1978 | Thompson | 70/52 X |
| 4,114,409 | 9/1978 | Scire | 70/230 X |
| 4,257,248 | 3/1981 | Williams | 70/233 X |

FOREIGN PATENT DOCUMENTS

| 361487 | 10/1922 | Fed. Rep. of Germany | 70/227 |
|---|---|---|---|
| 709559 | 8/1941 | Fed. Rep. of Germany | 70/227 |
| 245566 | 8/1947 | France | 70/227 |
| 1515234 | 1/1968 | France | 70/49 |
| 231005 | 5/1944 | Switzerland | 70/227 |
| 28550 | 12/1896 | United Kingdom | 70/233 |

Primary Examiner—Roy D. Frazier
Assistant Examiner—Carl F. Pietruszka

[57] ABSTRACT

A locking device with a main body member having a threaded bore therein adapted for screwing onto the axle bolt of a bicycle, a securing member for shackling the main body member to an adjacent frame member of the bicycle, and a lock device for locking the securing member to the main body member. The main body member also includes an annular collar protruding axially therefrom in radially spaced concentric relation to the axis of the threaded bore for extending concentrically over the axle nut of the bicycle.

3 Claims, 8 Drawing Figures

PASSIVE WHEEL LOCK FOR BICYCLES AND THE LIKE

BACKGROUND

This invention relates generally to locking devices, and more specifically to locking devices for securing the wheels on a bicycle or similar apparatus. It is common knowledge that bicycles are quite susceptible to theft, and a large variety of locking devices for securing bicycles are available and well known in the art. Some such locking devices are designed to lock the mechanical drive mechanism of the bicycle to prevent an unauthorized person from operating the drive mechanism to ride the bicycle away. However, since bicycles are relatively light weight, they can be picked up and carried off easily when the drive mechanism is locked. Therefore, many other locking devices have been developed to secure the bicycle to an immovable object to prevent unauthorized persons from carrying the bicycle away. As bicycles became more valuable, component parts, such as wheels, brake mechanisms, and derailling and shifting mechanisms also became popular items for theft. It is not uncommon for thieves to remove such components from bicycle frames, even when the frames are secured to solid objects. Therefore, it became necessary to also secure the components, primarily the wheels and derailleur and shift mechanisms of the bicycles as well as the frames to prevent loss from theft. Therefore, locking devices have been developed to not only lock the frames to an immovable object, but to also lock the wheels to such immovable objects to secure the bicycles and components from theft.

One common device for securing the frame and the wheels to an immovable object is an elongated cable in combination with a padlock, which cable can be threaded through the wheels and frame of the bicycle and then locked to an immovable object. While devices such as this elongated cable and padlock are quite effective, there are inherent disadvantages associated with their use. For example, they are heavy and cumbersome to use and become a burden to carry on the bicycle. A number of manufacturers began manufacturing quick detachable wheels that can be quickly removed from the bicycle frame, so that a bicycle owner could lock the frame of a bicycle to an immovable object and easily remove the wheels from the frame to carry them along with him until he returned to use the bicycle again. Obviously, while such a solution to the problem of theft of wheels and related components is effective, it is not always desirable for a person to carry the wheels of his bicycle whenever the bicycle is not in use an an alternative to carrying a cumbersome locking device when it is in use. Also, there are a number of quite strong and secure locking and anchoring devices available for permanent fixture to sidewalks and buildings for securing bicycle frames, and many institutions, such as schools, libraries, store, and the like have installed them for the convenience of their bicycle-riding customers. However, most of such devices still only attach to the bicycle frame. Therefore, if a person desires to use such devices, in order to protect the valuable bicycle components from theft, a person must still either carry the cable and padlock to secure the wheels or remove the wheels and carry them along.

It would be much more desirable to secure the wheels to the bicycle frame in such a manner that they could not be removed from the frame by unauthorized persons, yet would not interfere with the operation of the bicycle and could be easily removed by the bicycle owner for maintenance, repair, and the like.

SUMMARY OF THE INVENTION

Accordingly, it is an object of the present invention to provide a novel and improved wheel lock for securing the wheels of a bicycle to the frame in such a manner that they cannot be readily removed from the frame by an unauthorized person.

It is also an object of the present invention to provide such a novel and improved passive lock device that can be attached to the bicycle to secure the wheels and axle mounted components to the frame to prevent removal thereof from the bicycle, yet which will not interfere with normal operation of the bicycle.

Another object of the present invention is to provide such a novel and improved locking device that is readily adaptable for use on most bicycles, quick and easy to attach, and effective for preventing the removal of the bicycle wheels or axle-mounted components from the bicycle frame by unauthorized persons.

The passive wheel lock mechanism of the present invention includes a main body member having an internally threaded bore extending inwardly therein and adapted for screwing onto an axle bolt of a bicycle next to the axle nut. A securing member or shackle for securing the body member to an adjacent section of the bicycle frame is provided for releasable attachment to the body member, and a locking mechanism is provided to lock the securing device or shackle to the body member in such a manner that the body member cannot be rotated or screwed off the axle bolt. An annular collar protrudes axially outward from the body member in radially spaced concentric relation to the axis of the threaded bore for extension over the periphery of the axle nut of the bicycle. In one embodiment, the securing device or shackle is a short piece of flexible cable immovably secured at one end to the main body member and releasably secured at the other end to the main body member by a lock mechanism in the body portion. In an alternative embodiment, the securing member or shackle is a solid elongated rod having a loop therein to pass around a portion of the bicycle frame and both ends of which is removably secured in the main body member by a lock mechanism therein. In still another embodiment, the securing member or shackle is provided to removably pass through a portion of the body member, and a separate lock component is provided to prevent the removal of the securing member from the main body member.

BRIEF DESCRIPTION OF THE DRAWINGS

Other objects, advantages, and capabilities of the present invention will become apparent as the description proceeds taken in conjunction with the accompanying drawings, in which.

BRIEF DESCRIPTION OF THE PREFERRED EMBODIMENT

Figure 1:
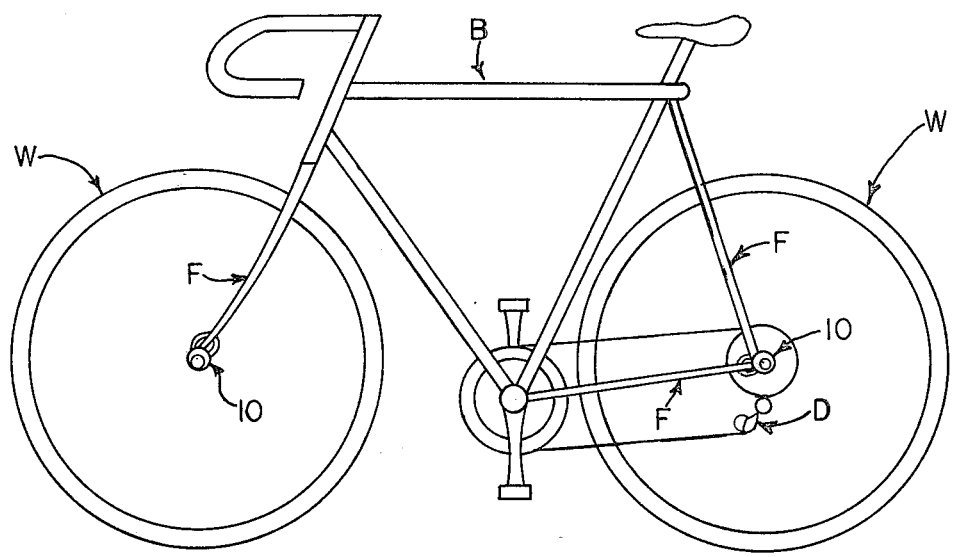
FIG. 1 is a side elevational view of a bicycle equipped with the passive wheel lock device of the present invention.
Figure 2:
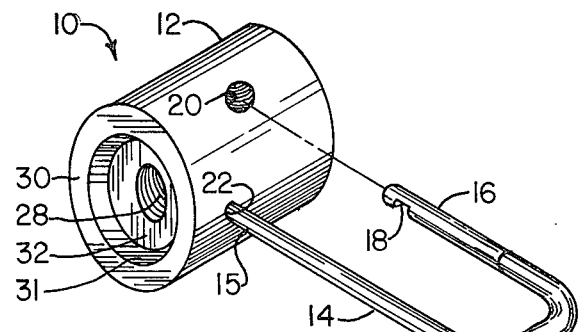
FIG. 2 is a perspective view of the passive wheel lock device of the present invention showing the end that is threadedly received on the axle bolt of the bicycle.
Figure 3:
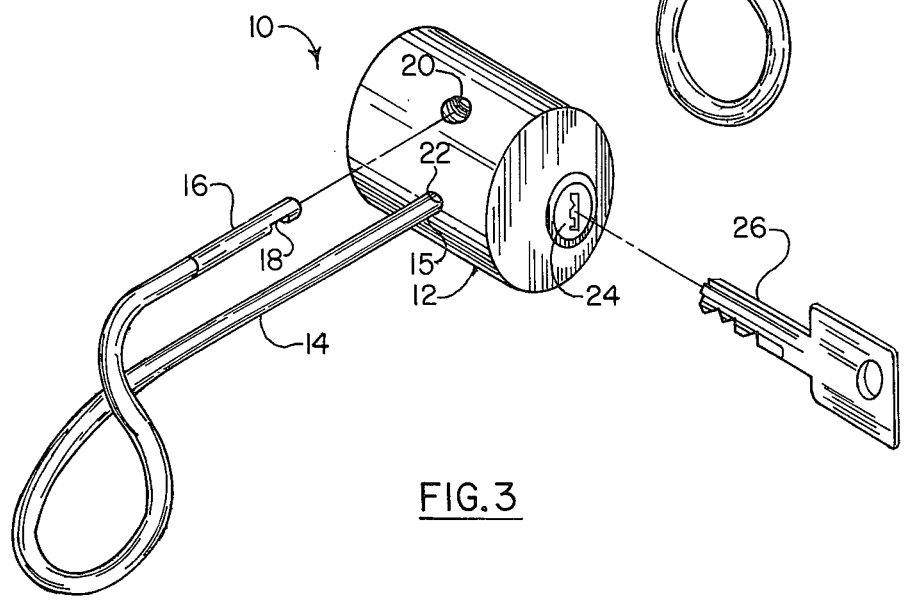
FIG. 3 is a perspective view of the opposite side of the passive wheel lock device showing the locking features.
Figure 4:
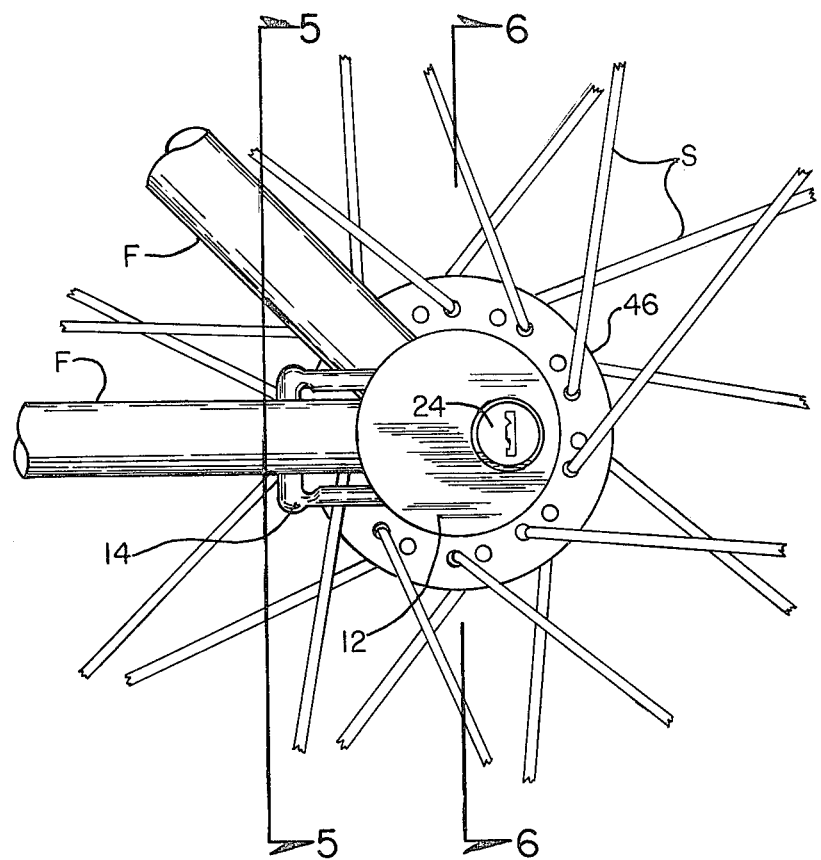
FIG. 4 is an enlarged elevational view of the passive lock device of the present invention mounted on the axle bolt of a bicycle and secured to an adjacent frame member of the bicycle.

The passive wheel lock device 10 of the present invention shown in FIGS. 2 and 3 is adapted for securing the wheels W of a bicycle B to the bicycle frame F by mounting on the axle bolts 36 of the bicycle as shown in FIGS. 1 and 4. As best seen in FIGS. 2 and 3, the locking device 10 of the present invention has a main body member 12 with an internally threaded bore 28 extending therein from one end. The body member 12 illustrated herein is cylindrical in shape, although the shape is not of particular significance. An enlarged bore 31 extends partially into the body portion concentric with the threaded bore 28, forming an annular collar 30 protruding axially outward from the end of the body member 12 in radially spaced concentric relation to the axis of the threaded bore 28, and the endwall 32 of the enlarged bore 31 forms a surface for abutting the body member 12 against the axle nut 36 of the bicycle B.

A pair of holes 20, 22 extend into the body member 12 in spaced apart relation from each other and transverse to the axis of the threaded bore 28. An elongated flexible securing member 14 has one end 15 permanently attached to the body portion 12 in hole 22. The other end of the flexible securing member 14 has a rigid portion 16 permanently affixed thereon and adapted for removable insertion into hole 20. The solid portion 16 includes a notched recess 18 near its distal end to engage an appropriate lock mechanism 24 in the body member 12 to releasably secure the end 16 of the securing member 14 in the body member 12. The end of the cylinder lock 24 is shown in FIG. 3 as a conventional type of lock operated with a key 26, although conventional combination lock mechanisms or other key lock mechanisms could be utilized with equal effectiveness. As an example, a conventional lock mechanism having a slideable plunger or a rotatable eccentric disc driven by the cylinder 24 could be provided for movement into and out of engagement with the notch 18 in end 16. However, since no particular novel locking mechanism is required or claimed in this invention, and a large number of locking mechanisms appropriate for use in this device are well known in the prior art, no particular locking mechanism or structure is shown or described herein.

Figure 5:
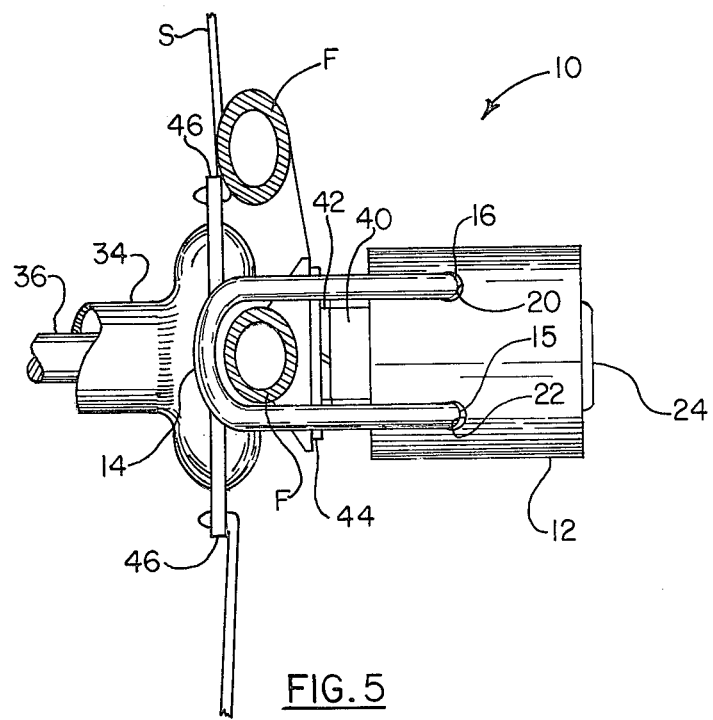
FIG. 5 is a front elevational view of the wheel lock device mounted on the bicycle taken along lines 5—5 of FIG. 4.
Figure 6:
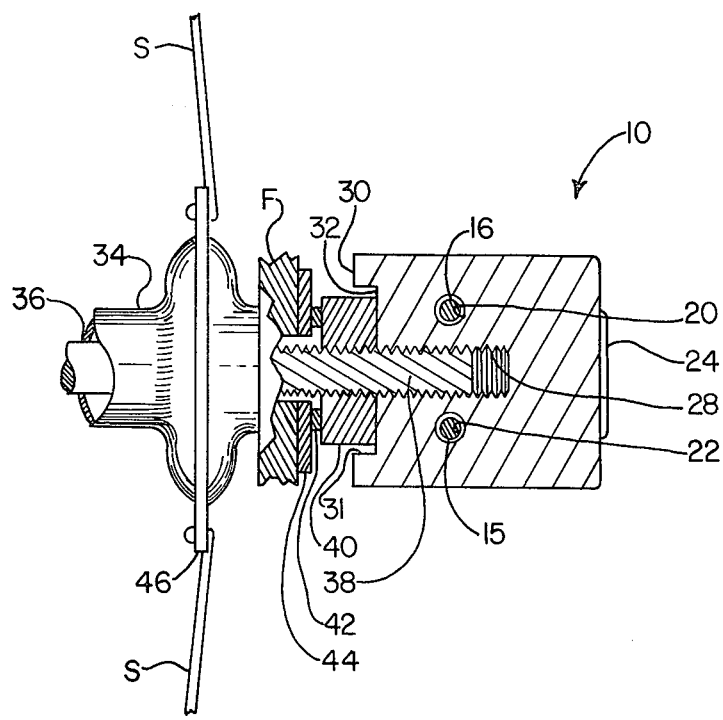
FIG. 6 is a cross-sectional view of the passive wheel lock device mounted on the axle of a bicycle taken along lines 6—6 of FIG. 4.

As best seen in FIGS. 4 through 6, the lock device 10 of the present invention is preferably mounted on the axle bolt 36 of a bicycle. In FIG. 4, an enlarged fragmentary view of the bicycle wheel with spokes S and hub flange 46 is shown mounted in a typical bicycle frame F, and the body member 12 is mounted on the bicycle axle 36 with the securing member 14 looped around a portion of the frame F and locked in the body member 12 by cylinder lock 24.

The mounting of the lock device 10 of the present invention on the bicycle is shown in more detail in FIGS. 5 and 6, wherein a wheel hub 34 with flange 46 is rotatably mounted on the axle bolt 36 in the frame F, with the spokes S radiating outwardly from the rim 46. The hub and axle assembly is secured to the frame F in the conventional manner by an axle nut 40 screwed onto the axle bolt 36 and tightened against the frame F with a large washer 44 and lock washer 42 squeezed between the frame F and axle nut 40. Obviously, therefore, in the conventional arrangement, the axle nut 40 must be loosened by screwing it away from the frame F in order for the wheel hub and axle assembly to be removed from the frame F.

The main body member 12 of the locking device 10 of the present invention is positioned on the axle 36 of the bicycle by threadedly screwing the body member 12 onto the threaded axle 36 with the threaded end 38 of the axle 36 being threadedly received into the threaded bore 28 in the body member 12 by rotating the body member 12 in the conventional manner of screwing threaded objects. The body member 12 is preferably screwed onto the axle 36 until the recessed portion 32 is abutted against the outside edge of the nut 40, as shown in FIG. 6. With the body member 12 screwed onto the axle 36 in this manner, the nut 40 cannot be loosened away from the frame F; therefore, the bicycle wheel hub and axle assembly cannot be removed from the frame F.

The flexible securing member 14 is then looped around a portion of the frame F adjacent the body member 12, as shown in FIG. 5, and the notched end 16 is then inserted into hole 20 as shown in FIGS. 5 and 6 where it is locked in that position by the locking mechanism 24, as described above.

When the securing member 14 is looped around a portion of the frame F and locked into the body member 12 as described above, the body member 12 cannot be rotated in relation to the securing member 14 or the frame F to unscrew it from the axle 36 away from the axle nut 40. Therefore, an unauthorized person who does not have the means to unlock the securing device 14 from the body member 12, such as they key or correct combination as appropriate for the type of lock provided, he cannot loosen the axle nut 40 to remove the bicycle wheel, hub, and axle assembly from the frame.

The annular collar 30 protrudes axially outward from the body member 12 over at least a portion of the axle nut 40 as shown in FIGS. 5 and 6 when the body member 12 is screwed onto the axle nut 40. This feature effectively shields any portion of the exposed axle 36 from cutting devices, such as hacksaw blades and the like. Consequently, a thief desiring to bypass the securing device 10 of the present invention by sawing through to axle would have to hacksaw all the way through the axle nut 40, which would be a long and tedious process and undesirable to most thieves who prefer quick removal or detachment of the desired components. Further, not only the body member 12, but the nut 40 and washers 42, 44 could be preferably fabricated of a hard steel so that removal by hacksawing in any reasonably convenient length of time for a thief would be virtually impossible. Of course, it is also contemplated that the securing device 14 would be fabricated of an extremely hard steel cable or other similarly theft-proof material such as those well known in prior art lock devices and known to those skilled in the art.

It can be appreciated that this locking device 10 of the present invention can be used effectively to secure any axle mounted component of the bicycle, in addition to the wheels W, such as derailleur, mechanisms D, shifting devices, and the like to prevent theft thereof, as long as the bicycle has the end 38 of the axle 36 exposed so that the body portion 12 of the lock device 10 can be screwed thereon and secured against unscrewing by shackling it to an adjacent frame member. Such an exposed axle end 38 is common to most commercially available bicycles, so the lock device 10 of the present invention is readily adaptable for immediate and easy mounting on most bicycles.

Figure 7:
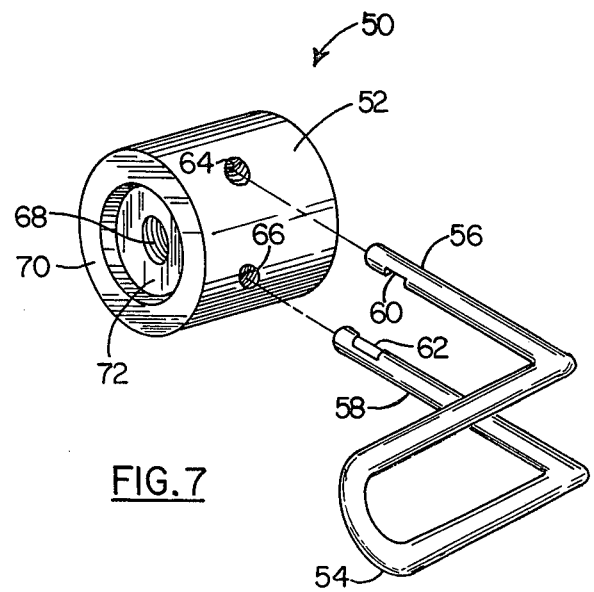
FIG. 7 is a perspective view of an alternate embodiment of the present invention wherein the securing member is an elongated rod formed with a loop therein, both ends of which are adapted to be locked in the main body member.

An alternative embodiment 50 of the locking device of the present invention is shown in FIG. 7. The locking device 50 of this embodiment includes a cylindrical body member 52 with a threaded axial bore 68, recessed portion 72, and annular collar 70, all similar to the preferred embodiment 10 described above. Two transverse holes 64, 66 are provided in the body member 52 in spaced-apart relation from each other and in alignment with an appropriate locking mechanism therein. However, the securing member 54 in this embodiment is in the form of a rigid shackle formed of an elongated looped rod with the ends 56, 58 in spaced apart relation to each other corresponding to the transverse holes 64, 66 in the body member 52. Appropriate notches 60, 62 are provided in the ends 56, 58 for engagement with an appropriate lock mechanism (not shown) in the main body portion 52, similar to the preferred embodiment described above, but with two latches to engage the two ends 56, 58 of the shackle 54. In mounting and use on the bicycle, this embodiment 50 functions similar to the preferred embodiment 10 described above, except that the shackle 54 is completely removed from the body member 52 to loop it around an adjacent frame section F and then insert it for locking engagement in the body member 52 to secure the body member 52 from being unscrewed and removed from the axle 36.

Figure 8:
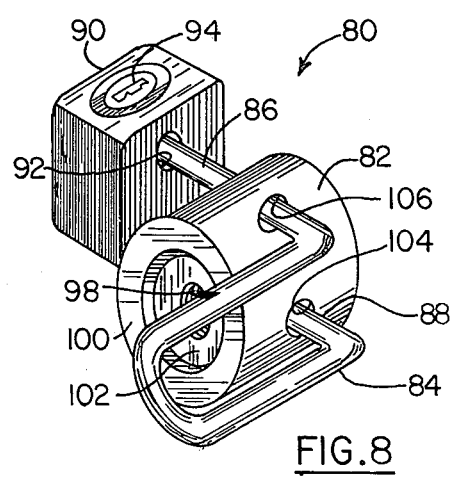
FIG. 8 is a perspective view of still another embodiment of the locking device wherein the securing member passes entirely through a portion of the body member and a separate lock component is provided to prevent the removal of the securing member from the main body member.

Still another embodiment 80 of the present invention is shown in FIG. 8, wherein a cylindrical body member 82 is provided with a threaded axial bore 98, recessed portion 102, and protruding annular collar 100, similar to the embodiments described above. However, in this embodiment, the locking machanism is not provided in the main body member 82. Instead, the transverse holes 104, 106 extend entirely through the body member 82, and a separate locking component 90 with an appropriate locking mechanism 94 is provided for releasable locking engagement with the ends 86, 88 for the securing member 84. The mounting of this embodiment 80 and its use on a bicycle B is similar to that described for the embodiments 10 and 50 above.

Although the present invention has been described with a certain degree of particularity, it is understood that the present disclosure has been made by way of example and that changes in details and structure may be made without departing from the spirit thereof.

What is claimed is:

1. Passive bicycle lock apparatus for securing a wheel axle and hub assembly of a bicycle to the bicycle frame, comprising:

a main body member having an internally threaded bore extending therein and adapted for threaded screw mounting on the externally threaded axle bolt of the bicycle;

securing means releasably attachable to said main body member and adapted for passing around and engaging a portion of the bicycle frame adjacent said main body member in such a manner that restrains said body member from rotation on said axle in relation to the frame and thereby securing said main body member in immovable position on the axle bolt; and lock means for releasably engaging said securing means and locking it in attachment to said main body member.

2. The lock apparatus of claim 1, including an annular collar protruding axially outward from said main body member in radially spaced outward concentric relation to the axis of said threaded bore for extending over the periphery of the axle nut on the bicycle.

3. The lock apparatus of claim 1, wherein said securing means includes an elongated member releasably attachable to said main body member in such a manner that said main body member is restrained from rotation in relation to said elongated member when attached thereto, said elongated member being adapted for looping around a portion of the bicycle frame adjacent said main body member for anchoring said main body member thereto.

* * * * *